United States Patent [19]

Sauter

[11] Patent Number: 4,758,149

[45] Date of Patent: Jul. 19, 1988

[54] CAPSULE FORMING PIN HAVING A BURNISH-HARDENED SURFACE

[75] Inventor: Erich W. Sauter, Washington Crossing, Pa.

[73] Assignee: Sauter Manufacturing Co., Hulmeville, Pa.

[21] Appl. No.: 927,529

[22] Filed: Nov. 5, 1986

Related U.S. Application Data

[62] Division of Ser. No. 626,154, Jun. 29, 1984, Pat. No. 4,667,498.

[51] Int. Cl.[4] .......... B29C 41/40

[52] U.S. Cl. .......... 425/275

[58] Field of Search .......... 425/275

[56] References Cited

U.S. PATENT DOCUMENTS

| | | | |
|---|---|---|---|
| Re. 21,094 | 5/1939 | Brating | 425/275 |
| 772,161 | 10/1904 | Longden | 425/275 |
| 2,428,406 | 10/1947 | Auzin | 425/275 |
| 2,568,129 | 9/1951 | Morris | 425/274 |
| 2,668,394 | 2/1954 | Auzin | 425/275 |
| 2,966,701 | 1/1961 | Heller | 425/275 |
| 4,247,006 | 1/1981 | Bodenmann et al. | 425/275 |

*Primary Examiner*—Willard E. Hoag

*Attorney, Agent, or Firm*—Richard C. Woodbridge

[57] ABSTRACT

A metal pin for forming gelatine capsules, having a work-hardened surface including a circumferential groove, even the surface defining the groove being work-hardened.

4 Claims, 5 Drawing Sheets

CAPSULE FORMING PIN HAVING A BURNISH-HARDENED SURFACE

This is a division of application Ser. No. 626,154, filed June 29, 1984, now U.S. Pat. No. 4,667,498.

BACKGROUND OF THE INVENTION

1. Field of the Invention

The invention relates to an improvement in lockable gelatine capsules and a method and apparatus for roller shaping a locking groove in the forming pin for the cap.

2. Description of the Prior Art

Self locking gelatine capsules are widely used in the pharmaceutical industry. A common type is described in U.S. Pat. No. 3,399,803 entitled "Self-Locking Medicament Capsule" and assigned to Parke Davis and Company, Detroit, Mich. A corresponding Canadian Pat. No. 805,125 entitled "Self-Locking Gelatine Capsule" issued on Jan. 28, 1969. Both patents describe a gelatine capsule cap having a circumferential annular beveled ridge which extends inward from the cap sidewall. Optionally, the capsule body may have a complimentary circumferential groove to mate with the inwardly projecting circumferential ridge on the cap body. The inwardly directed circumferential ridge on the gelatine cap friction locks with the gelatine body or mates with the circumferential grooves in the gelatine body of the capsule, if such a mating groove is present on the capsule body. The beveled ridge on the capsule cap has a triangular contour including leading and trailing sidewall faces having a bevel angle up to about 10° and an optional flat surface between the two beveled sidewalls.

Similar capsule structures are described in U.S. Pat. Nos. 3,508,678 and 3,664,495. Canadian Pat. No. 930,674 issued on July 24, 1973 and entitled "Locking Capsule" is the foreign counterpart to U.S. Pat. No. 3,664,495. U.S. Pat. Nos. 3,508,678 and 3,664,495 disclose alternative embodiments for self-locking capsules having locking grooves and ridges in the body and caps of the capsule respectively. In addition, both patents further describe the use of indents to provide additional locking security. The indents, known as "prelocks", provide a mechanical fit as distinguished from the friction fit between the inwardly facing locking ridge of the capsule cap and the optional locking groove of the capsule body. Pre-locking indents are now a common feature of modern gelatine capsules.

Additional efforts have been made to improve the locking characteristics of self-locking gelatine capsules. For example, U.S. Pat. No. 3,584,759 entitled "Separation-Resistant Capsule" describes a gelatine capsule in which the cap and body portions each increase in diameter from their domed end towards their open-end so that they mate tightly with each other. The capsule includes a sealing zone where the actual mating of the cap and body takes place. U.S. Pat. No. 4,247,006 describes another technique in which the open end of the body portion of the capsule has a slightly reduced diameter at its open end so as to improve its mating characteristics with respect to the cap portion of the capsule.

The prior art described above tends to have a number of disadvantages. First, the locking ridge and complimentary groove structure of the capsules tends to have angular, i.e. sharp profiles. Note, for example, the "triangular" contour of the locking ridge described in U.S. Pat. No. 3,399,803. The sharp angle of the locking ridge defines a smaller area of locking contact and therefore a weaker frictional mate with the capsule body. Second, the angular nature of the locking ridge also tends to weaken the sidewall of the gelatine cap. Therefore, it is not uncommon to find that a substantial number of capsules are ultimately broken in the cap region due to the relative weakness in the vicinity of the locking ridge. Third, prior art forming pins tend to wear out quickly. In contrast, the capsule pins formed by the method described in this disclosure tend to have a significantly longer life.

SUMMARY OF THE INVENTION

Briefly described the invention comprises an improved self-locking gelatine capsule and a method and apparatus for making the same. The gelatine capsule includes an inwardly extending locking ridge having a smooth, rounded cross-sectional profile. The locking ridge preferably has a radius of approximately 0.090". A metal forming pin is used to mold the unique shape of the capsule cap. Each forming pin is made by rolling an unfinished pin under great force between two rollers. During the shaping process the pin is supported by an anvil located just below the center line connecting the axes of rotation of the two rollers. One roller is preferably smooth while the other roller preferably has a cross-sectional profile complimentary to that of the pin used for forming the locking groove in the capsule cap. Approximately 6 tons of pressure is applied to the pin during the shaping process. The force is sufficient to burnish the outer surface of the pin to a hard, smooth reflective finish. The finished pin is slightly longer and narrower than the original unfinished blank before working. Gelatine capsule caps are formed on the pin in the conventional manner. The improved, burnished pins have a longer life than capsule pins formed by conventional methods. The hardened burnished surface of the improved pins is better able to withstand the action of the gelatine capsule strippers which remove the capsules from the pins. Moreover, the capsules formed on the pins are superior in terms of locking strength and breaking strength.

According to one embodiment of the invention the unfinished pins are first turned on a precision turning machine. The precision turning machine initiates a small peripheral groove in the unfinished pin. The initial groove is then expanded and finished in the rolling and burnishing device previously described. Alternatively, the rolling and burnishing machine can exert enough force to produce a round groove without a guiding initial groove. After the pins are initially formed, they are stamped to add a pair of pre-lock indents in them. The finished pins are then attached to an elongated pin bar by means of an orbital riveter.

These and other features of the invention will be more fully understood by reference to the following drawings and detailed description of the preferred embodiment.

DETAILED DESCRIPTION OF THE PREFERRED EMBODIMENT

Figure 1:
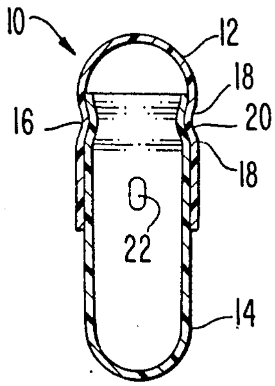
FIG. 1. (PRIOR ART)
FIG. 1 is a cross-section elevational view of a prior art capsule showing the nature of the locking ridge.

A prior art gelatine capsule 10 such as is described in U.S. Pat. No. 3,399,803 is illustrated in FIG. 1. Prior art capsule 10 includes a cap 12 and a body 14. An inwardly facing locking ridge 16 located in cap 12 engages the upper side wall of body 14. Body 14 may or may not include a locking groove complimentary in geometry to ridge 16. Ridge 16 faces inwardly from the sidewall of cap 12 and includes a pair of beveled sides 18 and a flat section 20 between the beveled sides 18. Flat section 20 may or may not be present in all capsules. Therefore the ridge 16 has a "triangular" geometry as described in U.S. Pat. No. 3,399,803. Beveled sections 18 are angled at about 10° with respect to the flat sidewall section or skirt of cap 12. In addition to the foregoing, many prior art capsules include pre-lock indents 22. The pre-lock indent 22 shown in FIG. 1 is seen from the back side. Details of prior art pre-lock indents 22 can be found in the disclosures of U.S. Pat. Nos. 3,508,678 and 3,664,495 as previously discussed. The problems associated with non-smooth locking ridges include poor locking efficiencies and relatively weak sidewalls at the ridge location.

The preferred embodiment 25 of the invention is illustrated in detail in FIGS. 2A–2E. Each capsule 25 includes a cap 26 and a body 28 as shown in an exploded view in FIG. 2A. Each cap includes a closed, domed end 32 and a shoulder 36 where the domed end stops. Locking ridge 30 extends inwardly beginning from the shoulder 32 and continuing to the lower cylindrical side wall or skirt 38. Lower cylindrical sidewall 38 terminates at cap edge 40 which defines the open end 42 of the capsule. A pair of pre-lock indents 39 are located on opposite sides of the lower cylindrical sidewall 38.

Similarly, each body 28 includes a closed domed end 44 and a cylindrical sidewall or skirt 46 attached tangentially to dome 44 at a shoulder 48. The end of cylindrical sidewall 46 is defined by edge 50 which surrounds the open end 52 of the capsule body 38.

Figure 2A:
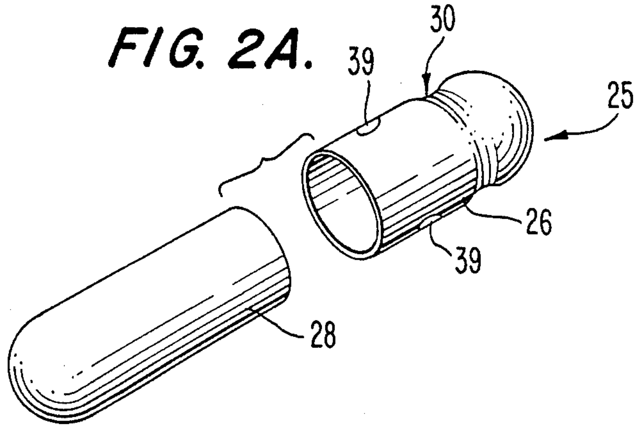
FIG. 2A is an exploded view of the preferred embodiment of the capsule of this invention showing the relationship between the cap and the body.
Figure 2B:
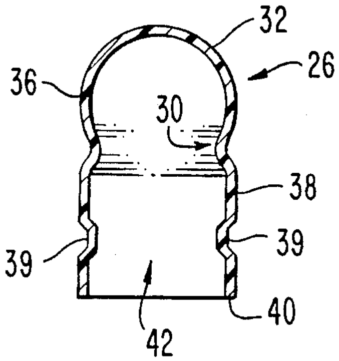
FIG. 2B is a cross-sectional view of the cap of the preferred embodiment shown in FIG. 2A.
Figure 2C:
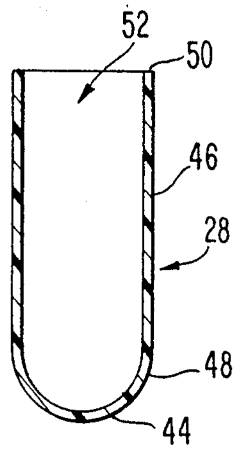
FIG. 2C is a cross sectional view of the body of the preferred embodiment shown in FIG. 2A.
Figure 2D:
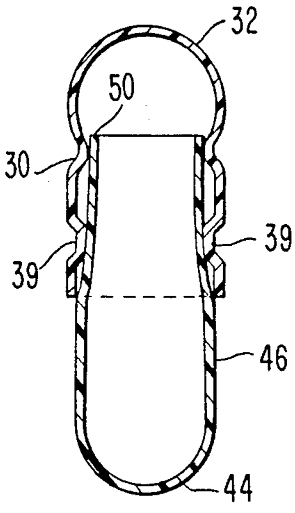
FIG. 2D is a cross-sectional view of the assembled capsule according to the preferred embodiment shown in the locked mode.

FIG. 2D illustrates the capsule 52 in its locked mode. When telescoped together as shown in FIG. 2D the sidewall 46 of the capsule body 28 comes in contact with both pre-lock indents 39 and locking ridge 30. The upper ede 50 preferably extends slightly beyond the point of contact between the inwardly facing locking ridge 30 and sidewall 46. The locking ridge 30 has a smooth, continuous radius $R_1$ and therefore the point of contact between the locking ridge 30 and sidewall 46 is relatively broad and smooth thereby creating a better lock. Moreover, the sidewall thickness of the locking ridge 30 is relatively uniform and therefore stronger than the angular or "triangular" shape of prior art locking ridges.

Figure 3A:
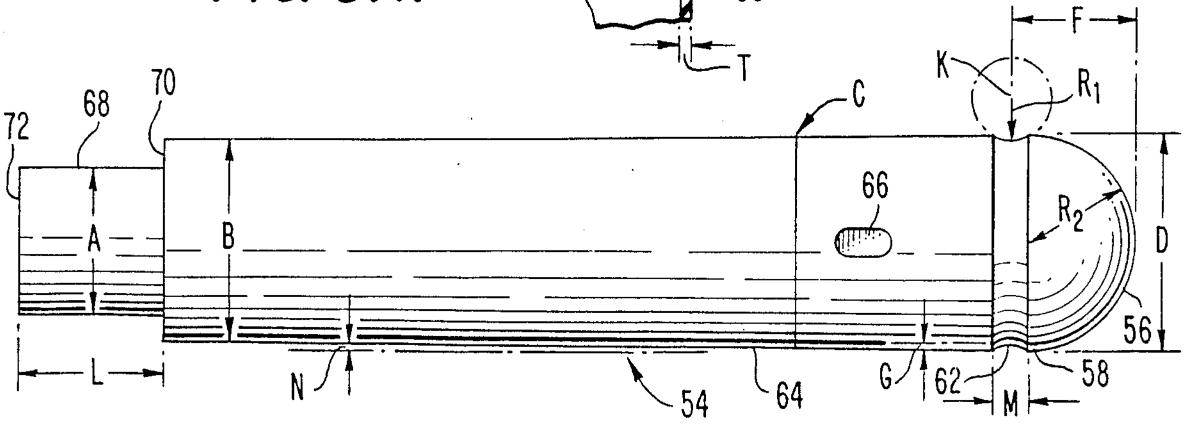
FIG. 3A is a side elevational view of a cap pin according to the preferred embodiment of the invention.

A cap pin 54 used to form a gelatine capsule cap 26 according to the preferred embodiment of the invention is illustrated in FIG. 3A. The geometry of the pin 54 is complimentary to that of cap 26 since pin 54 is a mold for cap 26. Accordingly, cap pin 54 includes a rounded dome 56, a shoulder portion 58, an inwardly directed groove 62 used to form locking ridge 30, a substantially flat cylindrical sidewall body 64, a pair of pre-locked indent forms 66, a flat portion 70 perpendicular to the plane of sidewall 64 and a spindle 68 suitable for insertion into a pin bar 89 such as shown in FIG. 3C. A flat surface 72 defines the end of spindle 68. Flat surface 72 is swaged by an orbital riveter which locks the cap pin into pin bar 89.

The preferred dimensions A–N associated with the cap pin 54 of FIG. 3A for a "0" size capsule are:

| Reference Letter | Dimension |
|---|---|
| A | 0.1875" |
| B | 0.303" |
| C | 0.2973–0.2978 |
| D | 0.2937–.2938 |
| E | 0.436 |
| F | 0.172 |
| G | 0.003–0.004" |
| H | 1.241 |
| I | 0.147 |
| K | 0.090 |
| L | 0.190 |
| M | 0.050 |
| N | 20' Ref. (i.e. ⅓") |

Figure 3B:
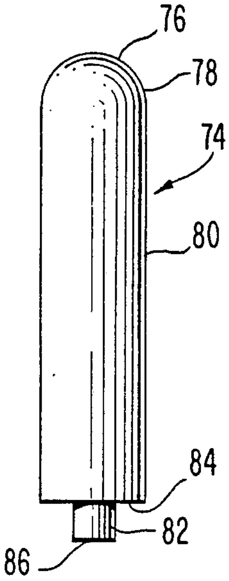
FIG. 3B is a vertical elevational view of a body pin according to the preferred embodiment of the invention.
Figure 3C:
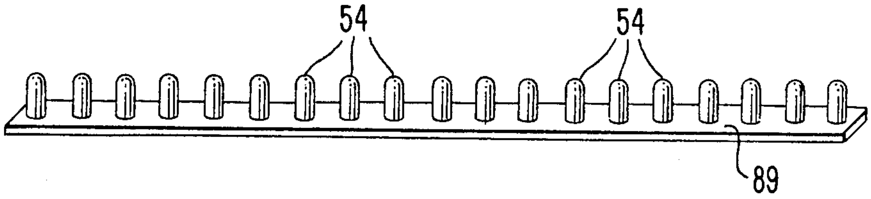
FIG. 3C is a perspective view of a pin bar.

A body pin 74 according to the preferred embodiment of the invention for forming a capsule body 28 is shown in detail in FIG. 3B. The geometry of the body pin 74 is complimentary to that of the preferred gelatine capsule body 28 since the body pin 74 is used to mold capsule body 28. Accordingly, the preferred pin body 74 includes a domed top 76, a shoulder 78, a cylindrical sidewall 80, a pin bar spindle 82, a flat 84 between spindle 82 and sidewall 80 and a flat end surface 86 which may be swaged into a pin bar by an orbital riveter in the manner previously described with respect to the cap pin 54.

Once the pins 54 or 74 are formed, by the method to be described subsequently, they are placed in a row on pin bar 89. The spindles 68 and 82 respectively of pins 54 and 74 are received in holes in pin bar 89. An orbital riveter is then used to swage the flat ends 72 and 86 respectively thereby securing the pins 54 or 74 in pin bar 89. Gelatine capsules are made from the finished pin bar 89 in the conventional manner known in the prior art.

Figure 2E:
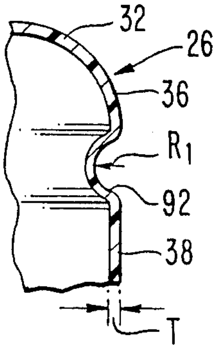
FIG. 2E is a break away detail view of the cap locking ridge.

FIG. 2E is a detail view of the locking ridge 30 formed in a cap 26. According to the preferred embodiment the locking pin ridge 30 has a radius R1 of approximately 0.090". The depth of the groove R1 can vary from between, 0.003" and 0.004" and is preferably 0.0035". The thickness T of the gelatine capsule is approximately 0.004".

Figure 4:
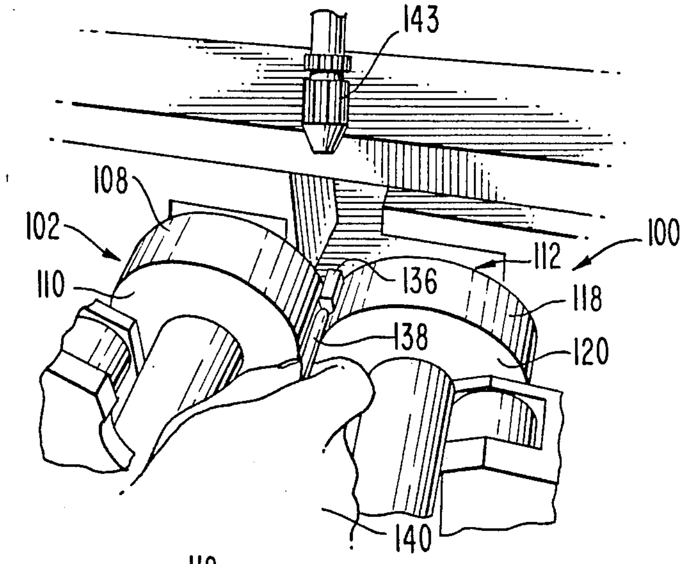
FIG. 4 is a perspective view of the pin rolling and burnishing machine according to the preferred embodiment of the invention.
Figure 5:
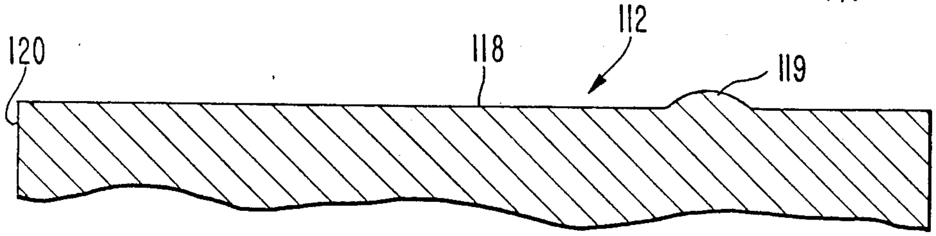
FIG. 5 is a cross-sectional view of the profile of the contour imparting roller of the pin rolling and burnishing machine of FIG. 4.

Pins 54 and 74 are shaped on a pin rolling and burnishing machine 100. A perspective view of a pin rolling and burnishing machine 100 is shown in FIG. 4. Machine 100 includes a flat drive roller 102 and a contoured sizing roller 12 having a profile complimentary to that of a cap pin 54 or a body pin 74. A cross-sectional profile of the contoured sizing roller 112 is shown in FIG. 5. The working surface 118 has a shape that is complimentary to the shape imparted to cap pin 54. For example, rounded projection 119 produces the groove 62 in cap pin 54 which in turn produces the rounded locking ridge 30 in cap 26. The cross-sectional view of FIG. 5 is taken at right angles to the flat sidewalls 120 of contoured roller 112.

Flat roller 102 rotates in direction 106 around an axis of rotation 104. Similarly, contoured roller 112 rotates in direction 116 around its axis of rotation 114. One important feature of the invention is that flat roller 102 rotates in the same direction as contoured roller 112. That is to say, rotational directions 106 and 116 are the same. Both rollers 102 and 112 are individually driven at a speed of approximately 75 r.p.m. Flat roller 102 also includes a relatively flat working surface 108 and a substantially flat sidewall 110 perpendicular to the plane of the flat working surface 108.

FIG. 4 shows an unfinished cap pin 138 held in the operator's hand 140 against a horizontal pin stop 136. Unfinished cap pin 138 rests on an anvil support 130 when it comes into working contact with rollers 102 and 112 according to the preferred method of shaping the pin. Oil from an oil feed line 143 plays on cap pin 138 while it is being rolled and burnished.

Figure 6A:
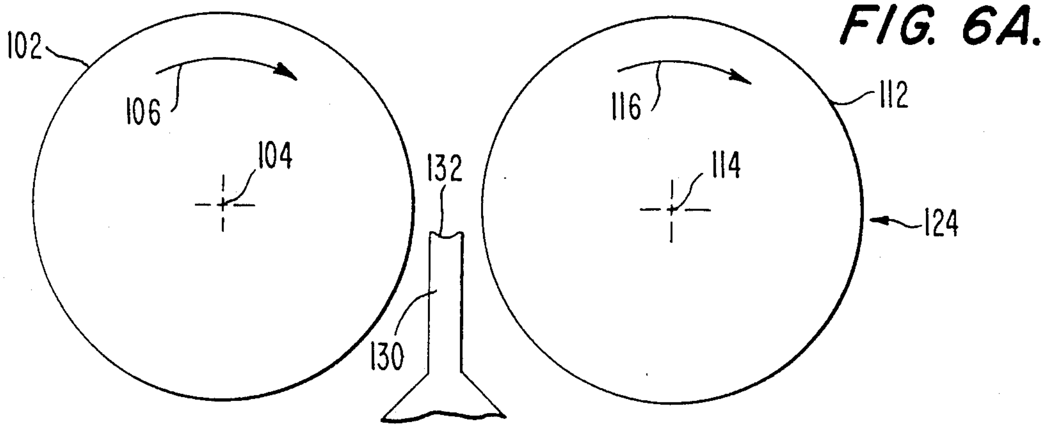
FIG. 6A illustrates the first step of the method of forming a pin according to the preferred method of forming same in which the two rollers are set to rolling in the same direction.

The steps employed to form the cap pin 138 are illustrated sequentially in FIGS. 6A through 6E. The set up, first step is shown in FIG. 6A. Flat roller 102 always stays in the same location. Contoured roller 116 is shown in its rest position 124. The machine is now set up to receive a work piece 138.

Figure 6B:
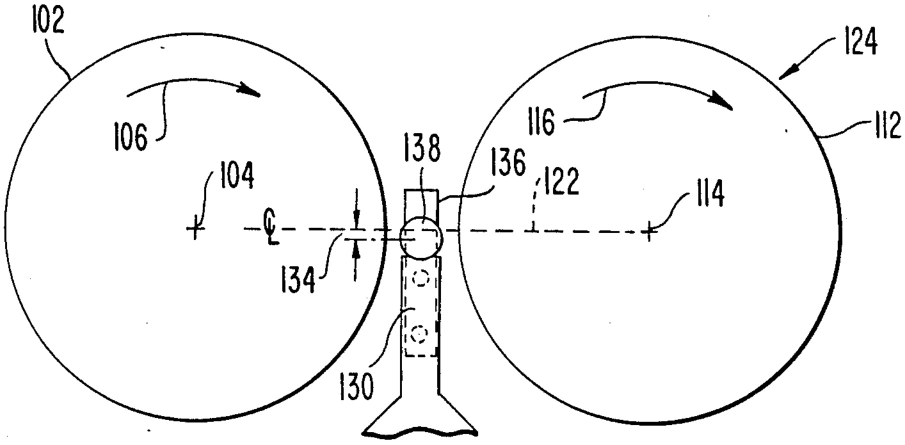
FIG. 6B illustrates the second step in which the unfinished pin is placed on the anvil support.

In the second step, shown in FIG. 6B, the work piece 138 is placed in the support indent 132 in anvil 130. The workpiece 138 comprises a short section of No. 303 stainless steel cut to the correct rough dimensions by a turning machine 146 such as that illustrated in FIGS. 7A and 7B and described later on in this disclosure. It is important to note that the center axis of cap pin 138 lies below the center line 122 connecting axes of rotation 104 with 114 by an amount 134 equal to approximately 0.032". The fact that cap pin 138 is below center line 122 by an amount 134 makes it possible to capture the cap pin 138 between rollers 102 and 112 as they rotate in the same direction 106 and 116 respectively. In FIG. 6B the roller 112 still remains in its rest position 124. The cap pin 138 is typically placed by hand 140 on the indent 132 as shown in FIG. 4. Alternatively, cap pin blank 138 could be automatically fed by a vibrating hopper, such as those made by the Syntron Corporation.

Figure 6C:
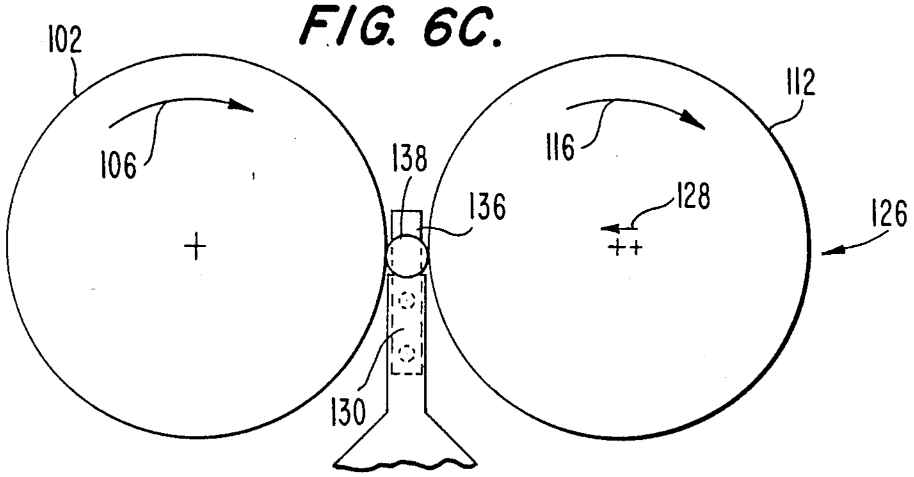
FIG. 6C illustrates the third step in which the pin contoured roller moves into working contact with the unifinished pin causing the pin to rotate.

In the third step, shown in FIG. 6C, the contour roll 112 has travelled a distance 128 to its work position 126. In the work position 126 cap pin 138 makes contact with flat drive roller 102 and contoured sizing roller 112 simultaneously.

Figure 6D:
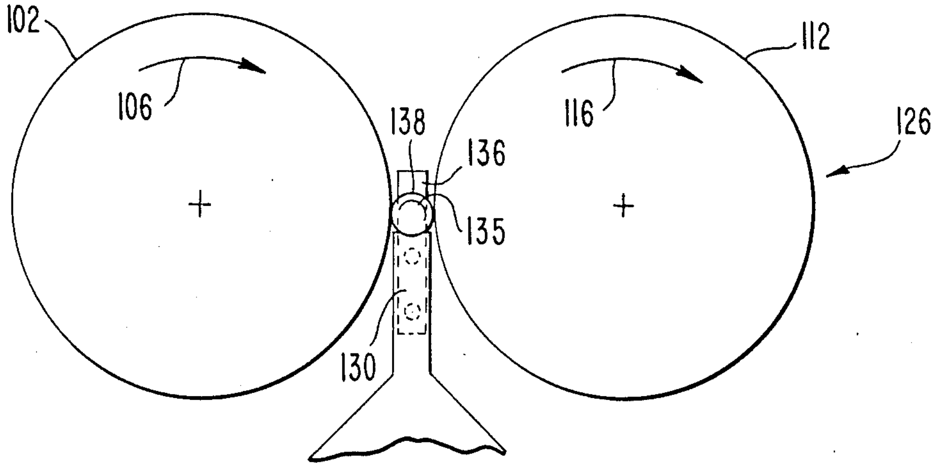
FIG. 6D illustrates the fourth step in which the pin rotates under the influence of the rotating rollers.

In the fourth step, shown in FIG. 6D, the contact of unformed cap pin 138 with rotating flat roller 102 and rotating contoured roller 112 causes the cap pin 138 to rotate in direction 135. As stated previously, rollers 102 and 112 both rotate at a speed of 75 r.p.m. in the same direction 106 and 116 respectively. Accordingly, unfinished cap pin 138 is caused to rotate in the opposite direction 135. The cap pin 138 rotates 16 times for each revolution, of rollers 102 and 112. The pressure exerted by rollers, 102 and 112 upon unfinished cap pin 138 is in the neighorhood of 6 to 8 tons. The cap pin 138 is rotated for 2–3 seconds and undergoes between 36 and 40 revolutions while being burnished. This substantial force causes the cap pin blank 138 to heat up to approximately 120° F., and it has been noticed, that the length of the blank becomes about 0.003" longer after the rolling process is completed. The burnishing machine 100 is capable of exerting forces of between 0 and 160 kilograms and is normally set in the 90–100 kilogram range. One major advantage of the burnishing process is that it increases the surface hardness of the finished cap pin by approximately 50%; i.e. the surface is burnish-hardened. The surface hardness improves the wearability of the cap pin when ultimately used in a gelatine capsule forming machine. The constant wear of the stripper mechanism for removing the gelatine capsule from the pins caused substantial wear in prior art cap pins. The cap pins made by the process outlined in steps 6A through 6E produces at least 50% longer life due to the increased surface hardening. Because of the extra pressure, it is necessary to form the anvil 130 from very hard materials. Metallic materials impregnated with Teflon® are acceptable. Another acceptable material is known as Vespel®. The characteristics of the foregoing materials are that they are highly dense and do not deform under high pressures. It is estimated that the anvil 130 absorbs approximately 1,000 lbs. of peak pressure during the working operation. The cap pin 138 rotates approximately 36 times under the 6–8 tons pressure exerted by rollers 102 and 112. Since rollers 102 and 112 rotate at approximately 75 r.p.m., accordingly, the dwell time of the wheel 112 is approximately 2–3 seconds.

Figure 6E:
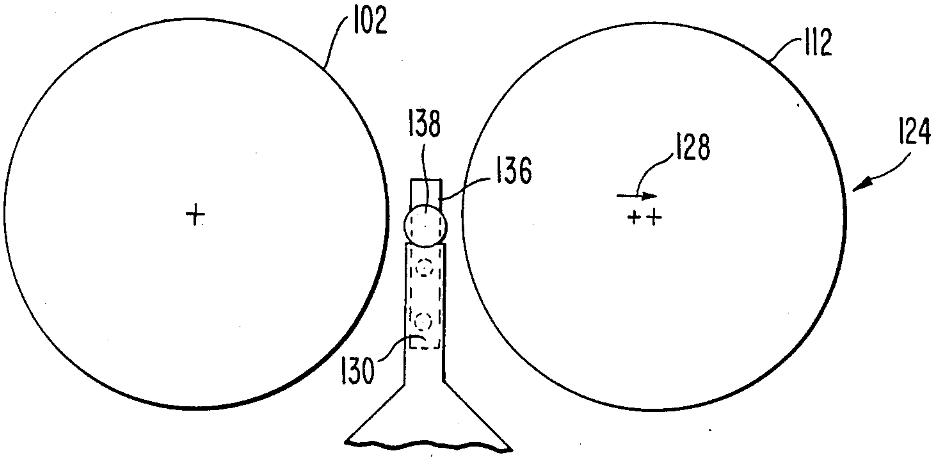
FIG. 6E illustrates the fifth, and last, step in which the contoured roller moves away from the work area releasing the finished pin from the machine.

FIG. 6E illustrates the fifth and last step in the forming process. In the fifth step the contoured roller 112 has travelled distance 128 back to its rest position 124. Finished cap pin 138 is then removed. After removal cap pin 138 may be tested for quality control purposes. Finished cap pins 138 are assembled on a pin bar 89 such as illustrated in FIG. 3C. Other cap pins 138 are formed by repeating steps 6A through 6E sequentially.

Figure 7B:
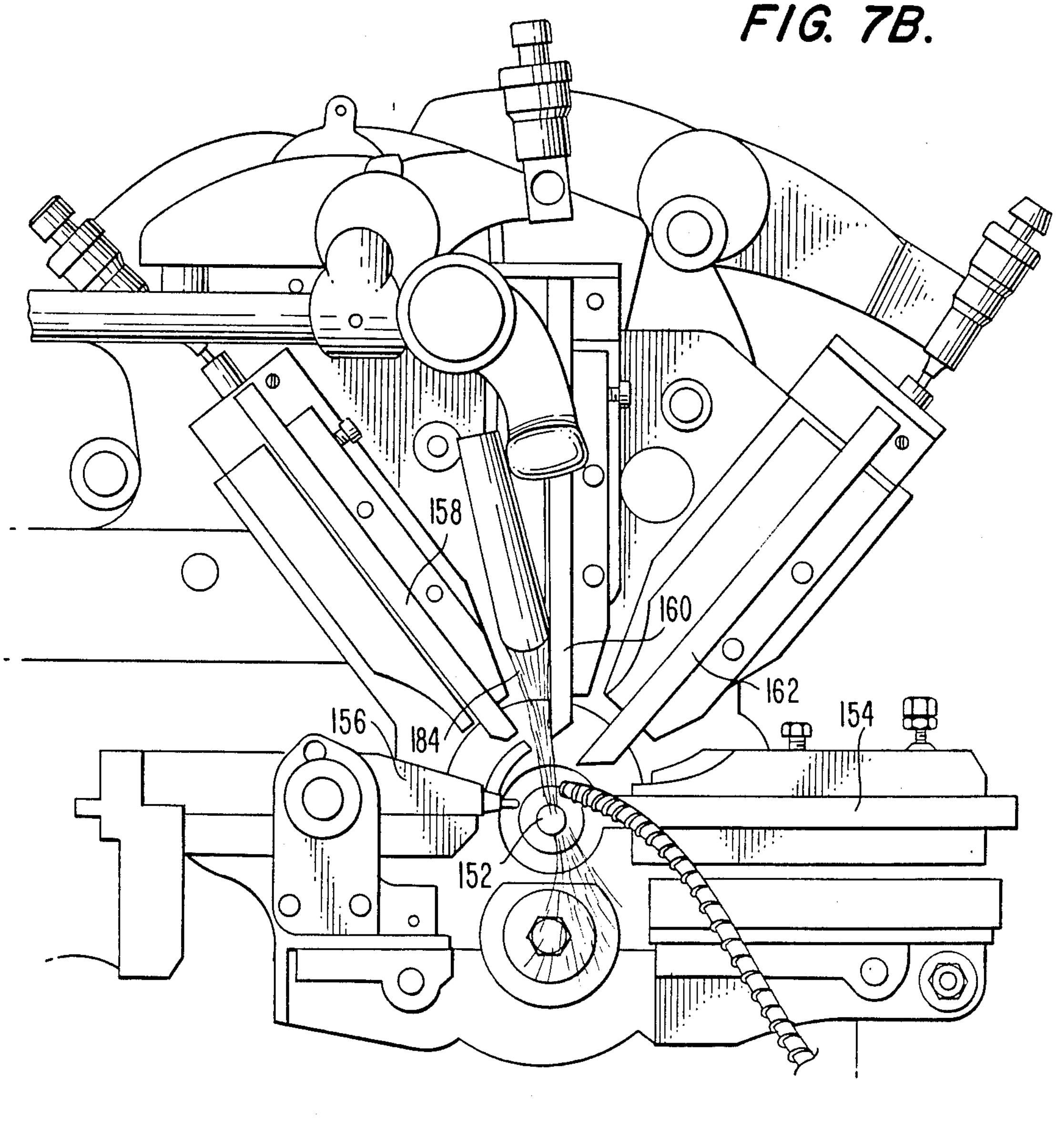
FIG. 7B is a front elevational view of the automatic precision turning machine of FIG. 7A.
Figure 7A:
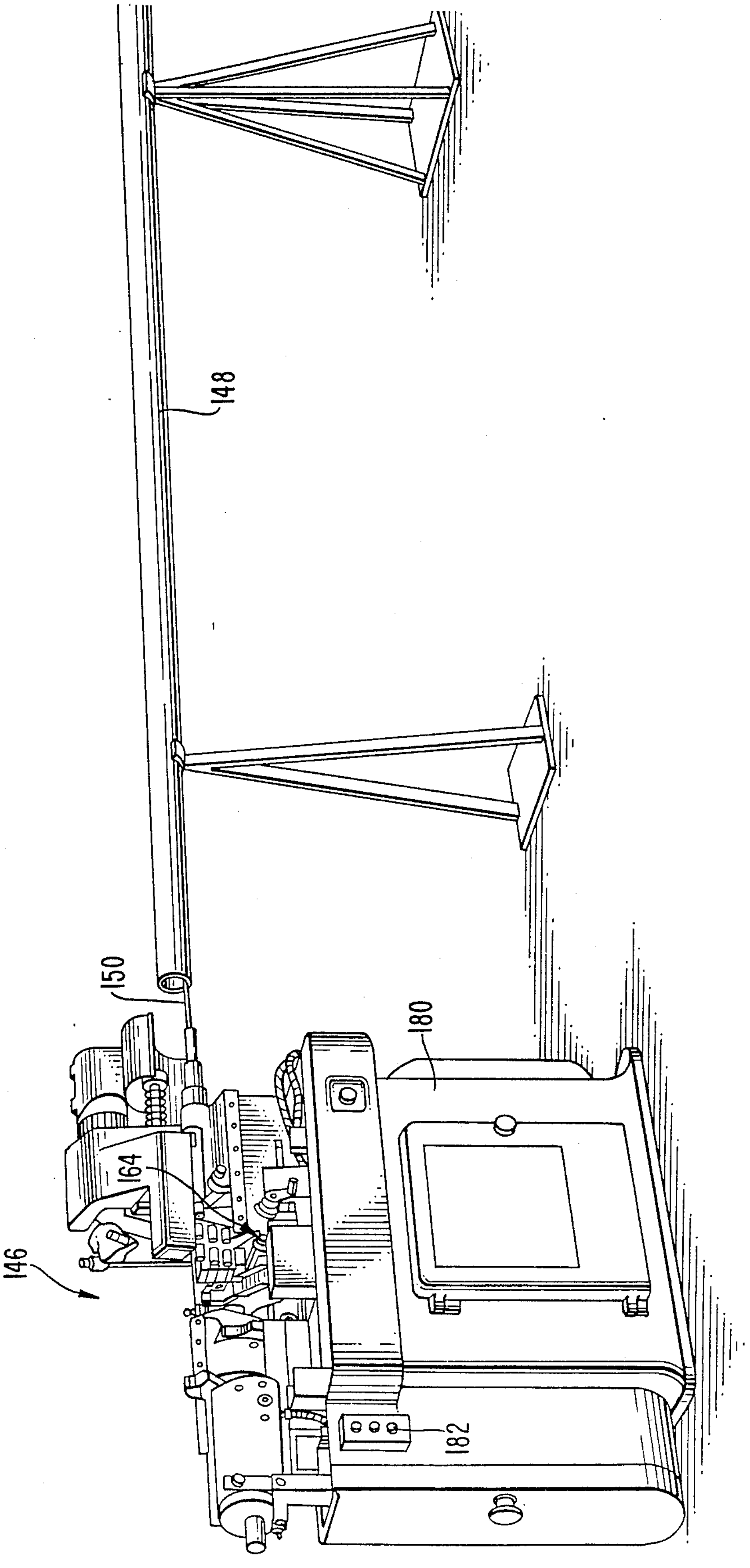
FIG. 7A is a perspective view of an automatic precision turning machine for forming an unfinished pin from a long rod of pin stock.

The burnishing process described in FIGS. 6A through 6E is preceded by a machining step such as illustrating in FIGS. 7A and 7B. The prior art technique for forming cap pins has typically included the machining of a locking groove on an automatic turning machine 146 such as shown in FIG. 7A. However, it is not believed that turning machines are capable of cutting an acceptable rounded groove which is the subject matter of the present invention. According to the present invention, a turning machine 146 is employed to rough out the basic dimensions of the unfinished cap pin 138 and the body pin. The turning machine 146 may also initiate a small "starter" groove to be enhanced later by contour roller 112. Alternatively, it has been found that it is not absolutely necessary to make a "starter" groove and accordingly, the cap pin groove 62 can be formed entirely from the projection 119 on the contoured roll 112.

A typical automatic turning machine 146 includes an automatic rod feed magazine 148. The automatic turning machine 146 illustrated in FIG. 7A is similar to the Bechler Model AR-10. Rod feed magazine 148 is capable of handling 12 ft. rod stock 150. Rod feed magazine 148 may handle one rod of No. 303 stainless steel at a time. Alternatively, rod feed magazines are available which will automatically feed bars from a hopper into magazine 148. The rod stack 150 passes through a rotating chuck 164 which advances the material in discrete increments into the work station. Automatic turning machine 146 includes a base 180 and an on/off switch 182.

Details of the work station of turning machine 146 are shown in FIG. 7B. An oil bath stream 184 plays over the work end 152 of rod stock 150 while the material is being machined. Five working tools 154, 156, 158, 160 and 162 respectively perform the machining operation. The five work tools are controlled by five cams that form an integral part of the machine. A sixth cam is used to control the advance of the rod stock 150 through rotating chuck 164. Automatic turning machines, similar to the Bechler Model AS-7 or AR-10 illustrated in FIGS. 7A and 7B are known to those of ordinary skill in the art. Accordingly, further detailed description of their structure is not necessary to an understanding of the invention.

The sequence of cutting tools 154 through 162 is the following:

| Step No. | Tool No. | Operation |
|---|---|---|
| 1 | 3 (158) | Cut off of previous pin |
| 2 | 4 (160) | Initial forming of dome |
| 3 | 1 (154) | Further forming of dome and sidewall |
| 4 | 2 (156) | Cut down to spindle |
| 5 | 5 (162) | Camphor first edge |
| 6 | 5 (162) | Camphor second edge |
| 7 | 3 (158) | Cut off (reinitiate cycle) |

The cutoff tool No. 3 (158) simultaneously initiates the front radius of the next pin. While a particular automatic turning machine and its operation has been described, it will appreciated by those of ordinary skill in the art that modifications can be made to the sequence of operations and the equipment and still produce the same results.

It is known that some prior art cap pins are ground, but it is not believed that any are formed in a manner substantially similar to that described in this disclosure. The burnishing technique of the present invention produces a pin and a groove having a six micron finish. The preferred depth of the cap pin groove is 0.0035" with a preferred range of 0.003 to 0.004. The very high quality finish allows the capsule cap 26 to be easily stripped off the cap pin 54 during the forming operation. This results in fewer broken capsules. Moreover, as previously discussed, the non-angled groove of the present invention causes fewer capsules to break during the filling process. This is a result of the fact that the gelatine capsules produced by the pins of the present invention have more uniform sidewalls and therefore have fewer weak points.

The rolling and burnishing machine 100 comprises a modified Zeny thread roller and burnishing machine. While such devices are known to be used for the purpose of putting threads on screws their use in the context of forming gelatine capsule pins and the like is believed to be entirely novel. The rolling and burnishing machine 100 is capable of pressures in the range of 0–160 kilograms tons due to its powerful hydraulic system.

While the invention has been described with reference to the preferred embodiment thereof, it will be appreciated by those of ordinary skill in the art that modifications may be made to the apparatus and steps described without departing from the spirit and scope of the invention.

I claim:

1. A pin for forming the cap of a gelatine capsule comprising:

a metal body;

a domed head located at one end of said metal body;

a cylindrical sidewall surrounding said metal body and extending downwardly from said domed head;

a groove extending around said cylindrical sidewall, said groove having a non-angular cross-sectional profile with a radius R; and a smooth, burnish-hardened surface with a finish of approximately six microns integrated in and covering the surface of said domed head, cylindrical sidewall and groove;

wherein the exterior shape of said pin is substantially the same shape and dimension as the inside of a gelatine capsule cap.

2. The pin of claim 1 wherein said cross-sectional profile of said groove has a depth of between 0.003" and 0.004".

3. The pin of claim 2 wherein said cross-sectional radius R of said groove is approximately 0.090".

4. The pin of claim 3 wherein said metal of said metal body comprises stainless steel.

* * * * *